United States Patent
Driscoll

(10) Patent No.: US 6,651,106 B1
(45) Date of Patent: Nov. 18, 2003

(54) FLOODING COMMUNICATION USING AN ACCESS TABLE TO ESTABLISH TRANSMISSION TIMES

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/482,435

(22) Filed: Jan. 13, 2000

Related U.S. Application Data

(60) Provisional application No. 60/115,921, filed on Jan. 14, 1999.

(51) Int. Cl.[7] .............................................. G06F 15/173
(52) U.S. Cl. ...................... 709/243; 709/230; 709/238
(58) Field of Search .............................. 709/230, 238, 709/243

(56) References Cited

U.S. PATENT DOCUMENTS

| | | |
|---|---|---|
| 4,237,534 A | 12/1980 | Felix |
| 6,032,194 A * | 2/2000 | Gai et al. .................... 709/239 |

FOREIGN PATENT DOCUMENTS

| | | | |
|---|---|---|---|
| JP | 04-368034 | * 12/1992 | ........... H04L/12/00 |

OTHER PUBLICATIONS

Petitpierre, Claude, "Meshed Local Computer Networks", IEEE Communications, Aug., 1984–vol. 22, No. 8, pp. 36–40.*

Hutchinson N et al: "The Flooding Sink—A New Approach to Local Area Networking" Computer Networks and ISDN Systems, NL, North Holland Publishing, Amsterdam. Vol. 11, No. 1, 1986, pp. 104 XP000619292, ISSN: 0169–7552, p. 2, Left–Hand Column, Line 26–Line 32, p. 3, Left–Hand Column, Line 33–Line 44.

Halsall, Fred: "Data Communications, Computer Networks and Open Systems", Addisson Wesley Publishers Ltd., Harlow, Essex, UK XP002149841, ISBN: 0–201–42293–X,p. 50, Line 1–Line 7.

* cited by examiner

*Primary Examiner*—David Wiley
*Assistant Examiner*—Joseph E Avellino

(57) ABSTRACT

A communication protocol and hardware is provided which allows a meshed network to reliably perform in a real-time environment. The protocol establishes that within specified regions of a mesh, a single node will transmit on that region at any given time. The transmitted message is propagated to all other nodes in the region by flooding the network. Immediately upon receiving each bit of data, a receiving node will immediately retransmit that bit, thereby increasing the speed of the flooding. Arbitration and lockout logic is provided which assures that nodes receiving data from multiple sources will be able to correctly handle and retransmit that data.

18 Claims, 14 Drawing Sheets

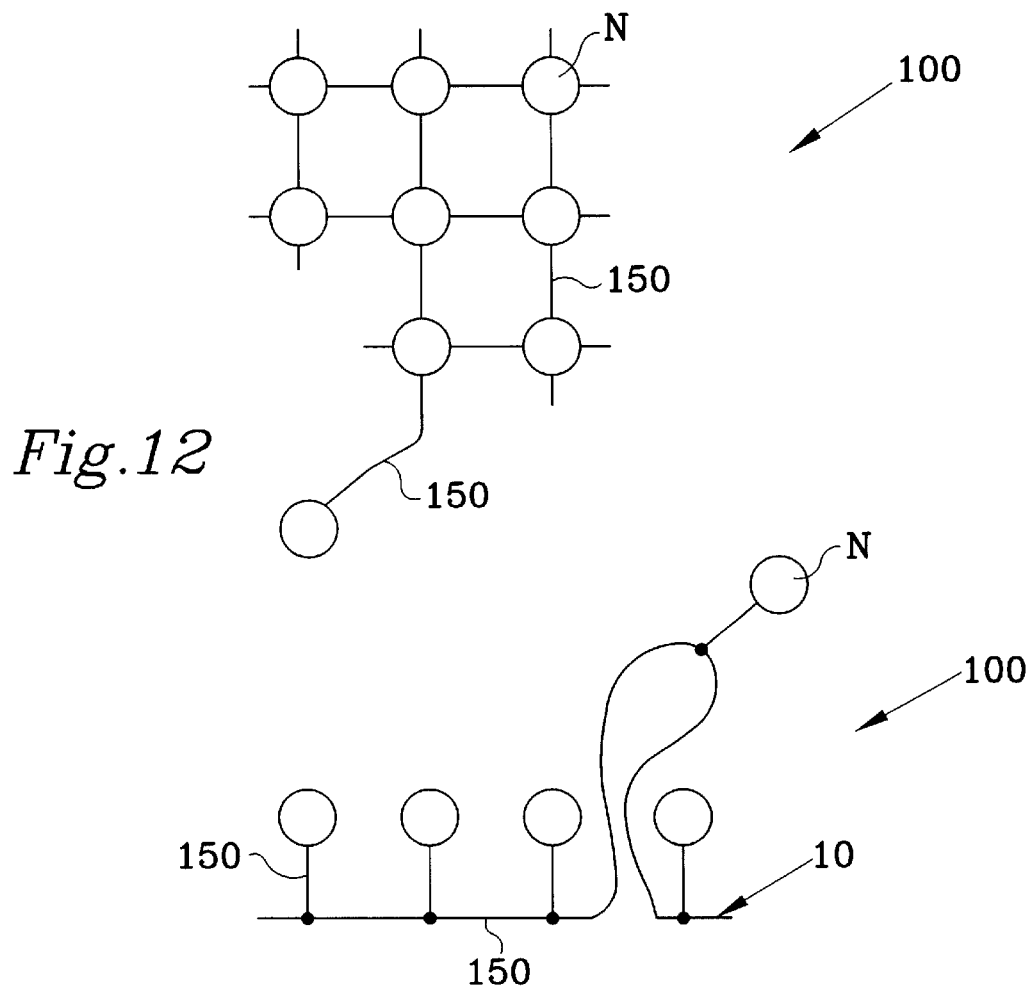
*Fig.12*
*Fig.13*
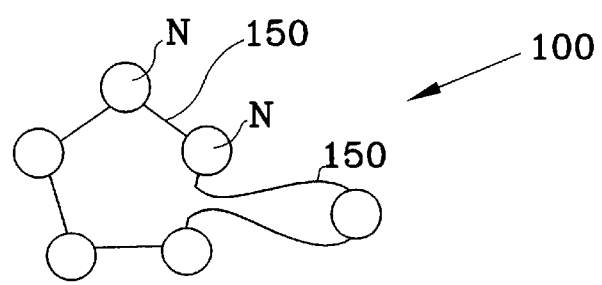
*Fig.14*

|       | Receive |   |   |   | Transmit |   |   |   |
|-------|---|---|---|---|---|---|---|---|
| Node  | N | S | E | W | N | S | E | W |
| 15/38 | 0 | 1 | 0 | 1 | 0 | 1 | 0 | 1 |
| 26    | 0 | 0 | 0 | 0 | 0 | 0 | 0 | 0 |
| 6/19  | 0 | 1 | 0 | 1 | 0 | 1 | 0 | 1 |
| 47    | 0 | 0 | 0 | 0 | 0 | 0 | 0 | 0 |
|       |   |   |   |   |   |   |   |   |

*Fig.19*

|       | Receive |   |   |   | Transmit |   |   |   |
|-------|---|---|---|---|---|---|---|---|
| Node  | N | S | E | W | N | S | E | W |
| 13    | 0 | 0 | 0 | 0 | 0 | 0 | 0 | 0 |
| 13/53 | 1 | 0 | 0 | 1 | 1 | 0 | 0 | 1 |
| 53    | 0 | 0 | 0 | 0 | 0 | 0 | 0 | 0 |
| 29/45 | 1 | 0 | 0 | 1 | 1 | 0 | 0 | 1 |
|       |   |   |   |   |   |   |   |   |

*Fig.21*

FLOODING COMMUNICATION USING AN ACCESS TABLE TO ESTABLISH TRANSMISSION TIMES

This application claims the benefit and priority of U.S. Provisional Application No. 60/115,921, filed on Jan. 14, 1999.

BACKGROUND OF THE INVENTION

1. Field of the Invention

This invention relates generally to communication methods and topologies. More specifically the invention relates to a circuit and protocol useful in propagating information through a mesh topology in a reliable manner for real-time applications.

2. Description of the Related Art

In order to communicate electronic information from one point to another, that information must be passed from the transmitting point to the receiving point along some connecting medium. In a telegraph, for example, an electric circuit is opened and closed in a predictable and understandable manner so that signals generated on one end of the line are received and understood at the other. This works extremely well when there is only one transmitting point and one receiving point. Problems begin to occur if both points are capable of transmitting along the same wire. If both points happen to generate signals at both ends of the wire, indiscernible noise is produced and neither side can understand the other's message. Consequently, a probability problem exists in that the system will work fine when only one end is transmitting and will collapse when both sides happen to transmit at the same time.

To increase the usefulness of the system, it is helpful to have multiple stations along an interconnected single line, spanning some great distance. In this configuration, there would be many stations having access to the communication network. Despite the obvious benefit of multiple stations accessing the network, the probability of any two stations transmitting at the same time is greatly increased. As discussed above, this creates the risk of any particular message not being received.

While telegraphs certainly are not relied on to communicate information today, many modern electronic devices suffer from the same problems as described above. For instance, different components in a personal computer must communicate with each other as well as a CPU. On a larger scale, a plurality of computers may wish to communicate with each other on an intranet or even the Internet. The problem is the same in each instance; how can interconnected electronic components communicate over a shared medium?

Many types of solutions have been used in the past to solve this communication problem. FIG. 2 illustrates one previous solution well known as a "bus" topography. Each Node N in network 100 is connected to the bus 10. When any Node N sends a message, its is rapidly received by all of the other nodes N by traveling along bus 10. Whichever Node N the message was intended for will likewise receive the message and process the information. There are three distinct problems with this type of topology. First, as in the telegraph example, multiple nodes N may wish to transmit at the same time. Second, if the link between any pair of nodes N is severed, the entire system is at least severely impaired and possibly totally disabled. Third, in real world applications the configuration of the nodes N is not likely to be positioned linearly as schematically illustrated.

To deal with the first problem, a media access control (MAC) protocol is needed which allows only one node to be transmit and at given time. One such protocol is known as Table Driven Proportional Access (TDPA), as shown in FIG. 11. With this protocol, each Node N has an identical table 20. The tables 20 will designate which particular Node N will be able to transmit at any given time. In the example presented, there are four nodes, numbered 1–4. Each Node N has a node indication pointer 30 which steps through the table sequentially and indicates to all of the nodes N concurrently, which Node N is designated to transmit. In FIG. 11, the pointer 30 indicates that node 3 is able to transmit. At this point, all other nodes N will "listen" for a message which may or may not be transmitted by node 3. After the message has been transmitted or after the time that would have been taken to transmit a message if no message is transmitted, the pointer 30 advances to the next index identifier which happens to indicate that node 1 will be free to transmit. The pointer advances through the table, and when the end is reached, it is reset to the beginning. In this manner, each Node N knows when to "speak" and when to "listen", thus avoiding the problem of two nodes N simultaneously attempting to transmit at the same time.

TDPA is a commercially accepted and known protocol, however there are a wide variety of other protocols which may be used with a standard bus. In some of those protocols, such as CSMA, multiple nodes N could transmit at the same time. When this occurs, the two signals will "crash" into one another. The system will then recognize this collision and each Node N will attempt to resend its respective message. To avoid colliding again, the two nodes independently select random delay times (which are highly likely to be different from one another) and wait for that period of time before resending. Probability suggests that the two messages will most likely eventually each be sent, though subsequent collisions are possible (thus causing each node to again select a random delay time and restart the process). There is a finite probability, however, that repeated collisions could continue to occur, prohibiting the transmission of the data. When using this protocol, the collision could occur at any given point along the bus. Thus, one or more nodes N may have received one of the messages prior to the collision and would therefore not recognize that there was a collision. Ultimately, when the message is resent, those nodes N would interpret the message as a new one, not a repeat of the old. To avoid this and to prevent collision "debris" from being misinterpreted as a valid message, when a collision occurs, each node detecting the collision immediately transmits a jam signal to the remaining nodes to ensure they detect that a collision has occurred. This protocol has a probability (but not certainty) that it will eventually get information to its proper destination, but it is inherently slow and easy to bog down.

The second major problem with the use of a data bus occurs when a link 150 between a pair of nodes N is severed or a particular node malfunctions (emitting spurious information). In this condition, the entire system is impaired. This malfunction could occur in either the connection between Node N and the bus or along the bus between the individual nodes N. FIG. 5 shows a bus 10 having four nodes N1–N4. As illustrated by the X through the bus 10, the link between N3 and N4 has been severed. This could completely shut down the system. Signal reflections from the severed ends can cause even the intact connections between nodes to not function correctly.

To prevent a catastrophic failure caused by the severing of a connection, redundant bus line 10' may be added. In summary, 100% of the existing bus line is duplicated to achieve one level of redundancy (can survive one detected failure). FIG. 8 shows how three buses may be used to achieve two levels of redundancy. Obviously, this method of protection requires an excessive amount of cabling, thus increasing the cost and complexity of the system.

Returning to FIG. 5, a second potential problem is depicted in which there is a problem with the node itself (see N2 crossed out). The node may be generating random or spurious signals thus producing noise on both the bus 10 and 10'. Such a malfunctioning node can also cause a change in the impedance of the connective media. When this occurs, the node is known as a babbling node. Thus, no matter the level of redundancy achieved, a single babbling node could shut down the entire system.

The third major problem with the use of a data bus is the physical parameters of the interconnecting cable. As shown in FIG. 13, the various nodes N are seldom linearly located, hence interconnecting cables, or links 150, of different lengths must be utilized. Due to the nature of the propagation of signals, a maximum length of interconnecting cable cannot be exceeded, thus limiting the physical configuration of the data bus.

Another commonly used topology is the ring, shown in FIG. 3. Here, the network 100 will form a serially connected closed loop of nodes N. The ring will suffer many of the same problems as the data bus described above. FIGS. 6 and 9 show the additional cabling required to create single and double redundancy. Similarly, FIG. 14 shows a ring which is configured asymmetrically. As can be seen, this configuration requires many cables of differing lengths.

Yet another known topography is a mesh network 100 as shown in FIGS. 1 and 7. In a mesh, each Node N is linked to a plurality of other nodes N in a grid-like manner. Therefore, there are a plurality of paths between a given pair of nodes N. It is important to remember that the "grid" may be configured in virtually any pattern or arrangement. That is, it need not be symmetrical or otherwise systemically patterned.

The great advantage to using a mesh is the inherent reliability of the structure. A mesh is the only inherently fault-tolerant topology. Turning to FIG. 4, if any particular link 150 is severed, an alternate route is still available. In large networks, this is a tremendous cost savings in that superior reliability is achieved while using less cable than in other topologies.

There are two commonly known networks that use a mesh topology. Namely, the worldwide telephone system and the Internet. When a telephone number is dialed, the first few digits dialed allow a connection to a nearby node; the next few allow connection to a more distant node and so on until the connection is established to the recipient. Once the connection is established, that single pathway is maintained for the duration of the call. All information is transmitted over that single path. No information is transferred until that path is fully established. Referring to FIG. 10 if Node S is the caller and Node D is the recipient, the connection is again shown by the solid arrows. This protocol is called circuit switching.

The Internet works on a slightly different principal. The Internet protocol causes the entire message (packet) to be transmitted to a neighboring node before an end-to-end path from the source to the destination is established. Information in the header of the message will define the ultimate destination and is used by each node seeing the message to route the message along a path which will lead it to the destination. Referring the FIG. 10, Node 10 transmits an entire message to one of its connected nodes. The connected node waits until the entire message is received and then retransmit the entire message. As described above, this will eventually reach Node D, and the message will be properly received. This protocol is called packet switching.

One problem with this "Internet" protocol is that each Node N is only capable of holding a finite amount of information at any given time. Therefore, if Node S transmits to a connected Node N but that connected node has insufficient remaining memory to store the message (the memory may be full with other messages being transmitted simultaneously), the message is lost or must wait. The mesh arrangement will allow the information to eventually reach a distant node, such as Node D. However, if the intended recipient or if any of the nodes in the path to the destination were memory deficient, the message would never be received.

Another problem with the Internet protocol is that it is rather slow in propagating the message from the source to the destination. Since the entire message must be transmitted as a whole each time it passes from a one node to other node before the receiving node can relay it along the path to the destination, the result is a relatively slow transmission. This makes such an arrangement undesirable for many real-time uses. Furthermore, more delay is added by the memory deficiency problems addressed above.

Turning to FIG. 10, a transmission protocol for a meshed network 100 will be described. Propagation of a signal is achieved by flooding the network 100. That is, a signal is generated by a source and transmitted to all directly connected nodes. Each receiving node then retransmits the message. The nodes N receiving that signal again retransmit the signal until eventually every node on the network has received copy of the transmission. In FIG. 4, Node S represents the source of the transmission and Node D is the intended destination. Node S transmits a signal to its four connected nodes (three of which are shown). Each of those nodes N then transmits until eventually Node D is reached. Now assume that the path shown by the solid arrows is the first path by which data reaches Node D. Once achieved, this becomes the selected path and the entire message is transmitted along the path shown by the solid arrows from Node S to Node D. Therefore, this flooding protocol is only used to determine a path and once so established, the redundant transmissions by the other nodes N are ignored. The next time a source wishes to transmit, this flooding protocol is again performed to establish a path. That way, if a link 150 has been severed between transmissions, a working connective path can still be established. It is worthwhile to note that the path shown by the solid arrows is only one of many which could occur. Using this mesh configuration, multiple links could be severed while still allowing 100% use of the network.

Another problem with the use of a mesh topology is the likelihood of any particular Node N receiving messages from two different nodes N at exactly the same time. The Node N is usually designated to select the message it receives first and to process that message. However, there will always be cases where messages arrive so close together that it is too close to tell which arrived first. In these cases, the electronics used to detect the message order can become metastable. When this occurs, the Node N will malfunction; basically oscillating back and forth between the two possible inputs without producing a useable output or selecting neither message, in which case the messages again are lost.

There are many applications where a properly working mesh would be advantageous, but they are not being used because the current mesh protocols are inadequate. For instance, real-time control systems on aircraft and large-scale vehicles, such as buses, require fast, reliable and accurate data transmission. The mesh topology provides the desired reliability but the existing protocols do not have the real-time properties needed for these applications. Therefore, there exists a need to have a highly reliable mesh network capable of rapid transmission to facilitate real-time applications.

SUMMARY OF THE INVENTION

The present invention relates to the propagation of data signals over a meshed network of nodes. A mesh is simply a plurality of nodes, connected to one another along a plurality of different paths. That way, if any particular link is severed or damaged, alternate routes are available for the data to travel.

Current mesh protocols are not feasible for use in systems that require reliable, real-time data transfer. The present invention modifies the concept of flooding to provide a protocol which is both fast and reliable.

In the present invention, a single node is allowed to transmit at any given time over a given region (subset) of the mesh. The region can be, and often is, the entirety of the mesh. To control the times when any particular node will transmit, the nodes utilize a variant of the flooding mechanism in conjunction with any media access protocol (MAC) which is applicable to the bus topology. An example of such a MAC is the TDPA protocol in which the nodes each have a corresponding table that indicates to all of the nodes when and which node may transmit. The table is time based. Therefore, each node has a particular amount of time within which to transmit. After that time has expired, the tables indicate that a different node is now capable of transmitting.

Once designated, the node begins to transmit a message bit by bit. The first bit is sent out on all links of the node and is received by other nodes so connected. Immediately upon receipt of the first data bit, the receiving nodes retransmit that bit to all of the links to which it is connected. In this manner, the entire network will soon be flooded by the first data bit.

Immediately thereafter, the transmitting node will send the second bit, then the third and so on, until the entire message is sent or its time limit expires. In this fashion, the entire message floods the network, bit by bit.

For very high speed communication links, it may be impractical to retransmit the messages strictly bit by bit. In these cases, a small number of bits can be used as the unit of data to be accumulated before being retransmitted. For example, with links that use 4B5B encoding, units of 5 bits can be used. However, it is desirable to use the smallest number of bits practical given that characteristics of the communication links.

In order to accomplish this flooding, the receiving nodes must have a mechanism to lock out the links that have not received data. The nodes must also have a mechanism by which they can distinguish between two messages that arrive on different links at or about the same time. Without such mechanisms, the message could be received for a second time by a node. In effect, this would cause the message to be sent to nodes that have already passed the message along. If this occurred, a single message could propagate through the network indefinitely. Furthermore, if two messages arrive at or about the same time, it is possible to cause current node electronics to become metastable, thereby causing the message to be corrupted or lost.

The present invention employs a novel class of arbitration and lockout circuits to solve these problems. Once the first bit of a message is received, the circuitry locks the node into a particular configuration for the remainder of the message. In that configuration, only the originally receiving link will be allowed to affect the node's outputs. In this manner, if data is sent back to an earlier node, it will be ignored. The circuitry also has an arbitration function. This allows the link which first receives the signal to control the outputs. However, if two links receive the message at exactly the same time, they are both allowed to affect the output. Since, MAC protocols for a bus topology allow only one message to be sent at any one time, simultaneously arriving messages would mean the both links are receiving the exact same data at the exact same time. The two messages are just copies of the same message, which have taken different routes through the mesh during its flood. Therefore, even if two links affect the output, the net result is the same because of the circuit's ability to combine the signals. Finally, if two signals arrive very close together, but not exactly simultaneously, the first signal is allowed to pass and becomes the output. As in any time-of-arrival arbitration circuit, it is possible for inputs to have specific arrival timing such that one or more flip-flops in the arbitration circuit become metastable. Using the correct class of arbitration circuitry allows for this portion of the node to become metastable while still allowing it to correctly output data from the node. The needed characteristic for an arbitration circuit to be useable for this invention is that it must allow at least one of the arbitrating inputs to affect the outputs at all times, even during periods of metastabiliy. Metastability is allowed to cause more than one input to affect the output, either simultaneously and/or sequentially.

Some bus topology MAC protocols require time synchronization. The TDPA protocol is an example. The retransmission delay as a message passes through nodes in its path from a source to a destination can accumulate to the point where it can degrade the synchronization. A compensation for the accumulated delay can be created knowing how many, or even specifically which, nodes the message traversed. A destination could use a table of values to compensate for this accumulated delay, given a priori knowledge of the mesh's specific topology, link and node delays; and the current mesh fault status and identification of the source. Alternatively, delay information can be added as a field in the messages. As a message traverses each node, the delay field can be updated "on the fly" with the node adding in its part of the delay and the delay of the incoming link. If the delay field is sent least significant bit first, a serial adder can be used which does not cause any additional message delay. If all nodes have the nearly the same input-to-output delay and all links have nearly the same propagation delay, the message's delay field is just a "hop count" of the number of links and nodes through which the message passed.

Another aspect of the present invention is the concurrent propagation of multiple messages over a single meshed network. As discussed above, bus topology MAC will only allow a single node to transmit at any given time. However, by dividing the mesh into a plurality of regions or submeshes, a single message could propagate over each submesh, thus increasing the effective bandwidth of the entire system.

Each node, in a preferred embodiment, has four links and a local connection to some resource such as a data processor or an input or output device. Therefore, each node is capable of handling two different messages simultaneously. Within a defined submesh itself, messages propagate by flooding just as in a single unified mesh. However, along a border dividing the various submeshes, the nodes will behave differently to contain the separate floods. That is, a message generated in a given submesh must remain in that submesh and not be allowed to enter a different submesh. The nodes along the border will generally have two links in one submesh, and two links in a different submesh. A protocol is established which temporarily connects the two links within a submesh while not having a connection between the links in different submeshes. Assuming the node has links numbered 1, 2, 3 and 4, a first message will only be allowed to be input and output over links 1 and 2, while a second message will only be allowed to be input and output of links 3 and 4. The particular connectivity of the links may be static or varied as often as each message. Variable connectivity information can be stored in tables that define the specific connectivity periods of time. These tables can be adjuncts to a TDPA table, or associated with time slots in a time division multiple access (TDMA), or the connectivity can be switched using various other protocols.

To further facilitate the integrity of the network, self checking pairs may be employed. That is, every original node is replaced with a pair of nodes and a pair of cables (rather than just one) form each link. Each message sent across a link is replicated in the two cables, one replicant coming from one of the nodes in the node pair transmitting into that link. Each pair of nodes compares the data it receives along the two cables of a link. If the two are identical, the node pair determines the message to be accurate. If, however, there is a difference in the message replicants, the node pair determines that the message has become corrupted, and disregards the message from that link.

It is an object of the present invention to provide a protocol for a meshed network which allows for reliable real-time use of a system.

It is another object of the present invention to provide a meshed network having nodes capable of arbitrating between concurrent messages and also to remain unaffected when various electronic components become metastable.

It is yet another object of the present invention to provide a meshed network with the ability to send multiple messages along various submeshes simultaneously.

It is yet still another object of the present invention to provide a minimal data signal to trigger the linking connectivity protocol in the various links of a node lying on the border of a submesh.

It is a further object of the present invention to provide a synchronizing component to a message stream in order to correlate the tables and time based pointers within each node of a network.

It is still another object of the present invention to provide a meshed network having self checking pairs, by which the integrity of the data transmitted may be verified.

It is yet still another object of the present invention to provide a mechanism by which newly added or rejoined nodes to a mesh can self synchronize with the remainder of the nodes.

BRIEF DESCRIPTION OF THE DRAWINGS

FIG. 12 is a schematic diagram which shows an asymmetric mesh network..

FIG. 13 is a schematic diagram which shows an asymmetric bus.

FIG. 14 is a schematic diagram which shows an asymmetric ring.

FIG. 19 is a table which shows the link interconnectivity of a node in a submesh.

FIG. 21 is a table which shows the link interconnectivity of a node in a submesh.

DETAILED DESCRIPTION OF THE PREFERRED EMBODIMENT

Figure 1:
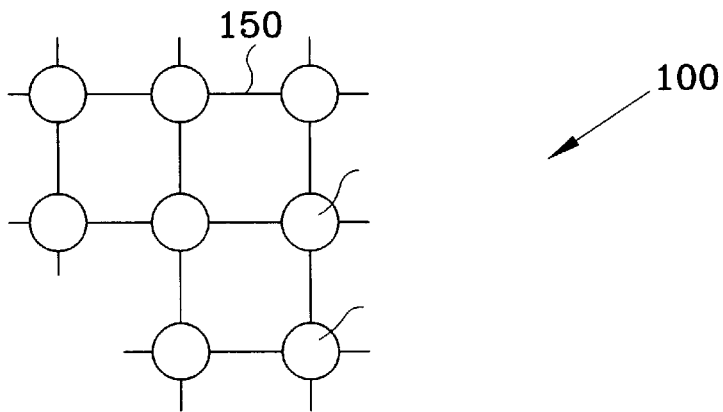
FIG. 1 is a schematic diagram which shows a plurality of nodes connected in a mesh.
Figure 2:
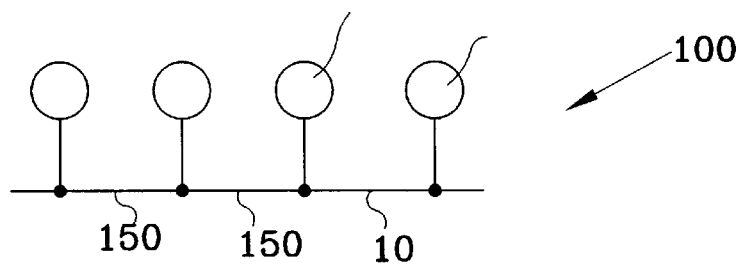
FIG. 2 is a schematic diagram which shows a plurality of nodes connected to a bus.
Figure 3:
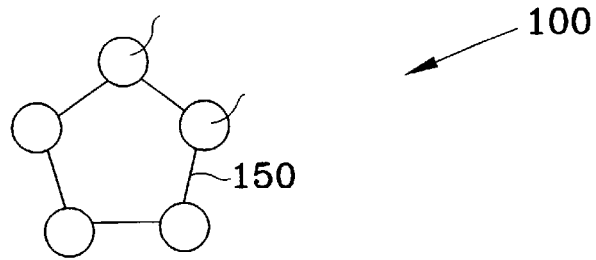
FIG. 3 is a schematic diagram which shows a plurality of nodes connected in a ring.
Figure 4:
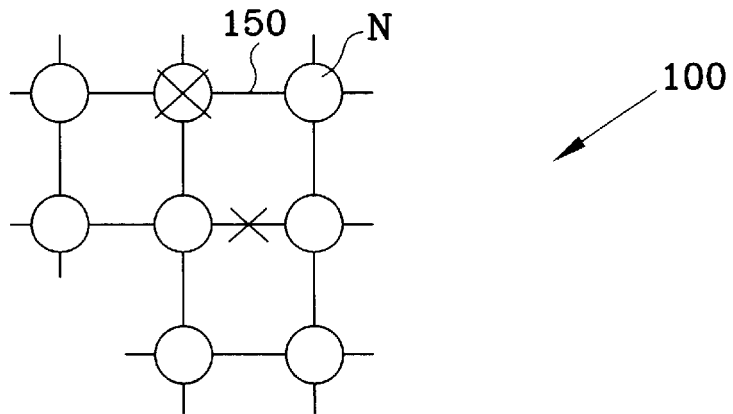
FIG. 4 is a schematic diagram which shows a meshed network having a bad node and a severed link.
Figure 5:
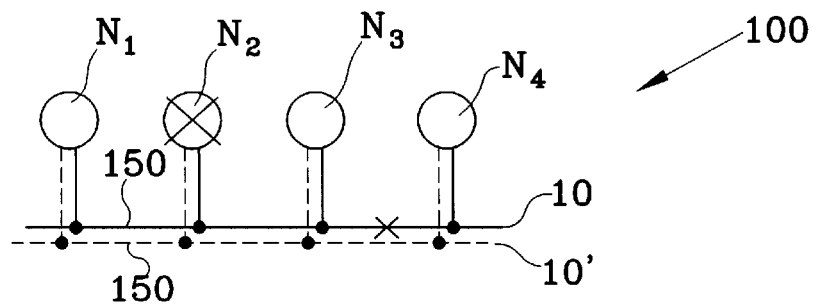
FIG. 5 is a schematic diagram which shows a duplex bus having a bad node and a severed link.
Figure 6:
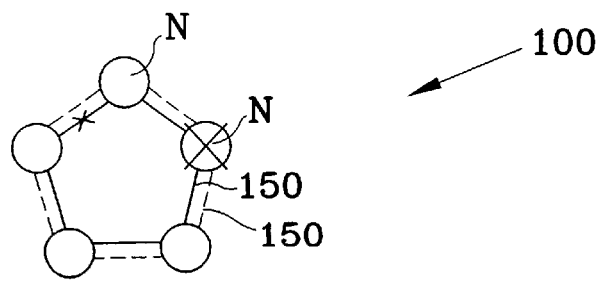
FIG. 6 is a schematic diagram which shows a duplex ring network having a severed link and a bad node.
Figure 7:
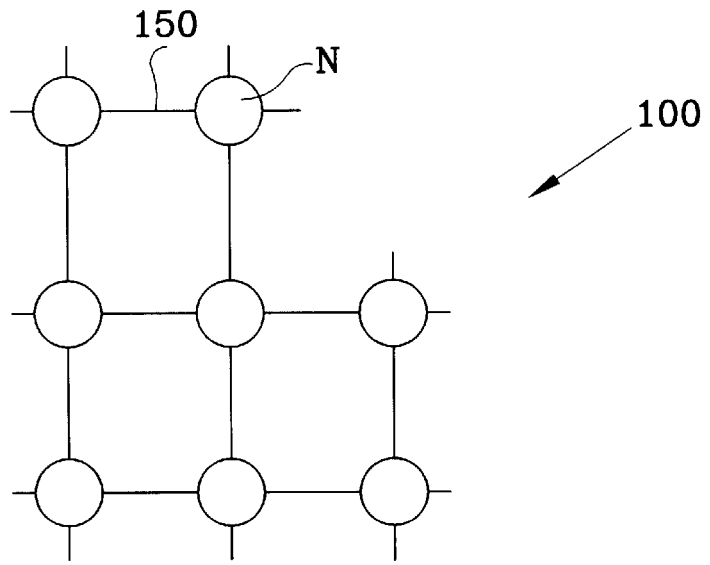
FIG. 7 is a schematic diagram which shows a meshed network.
Figure 8:
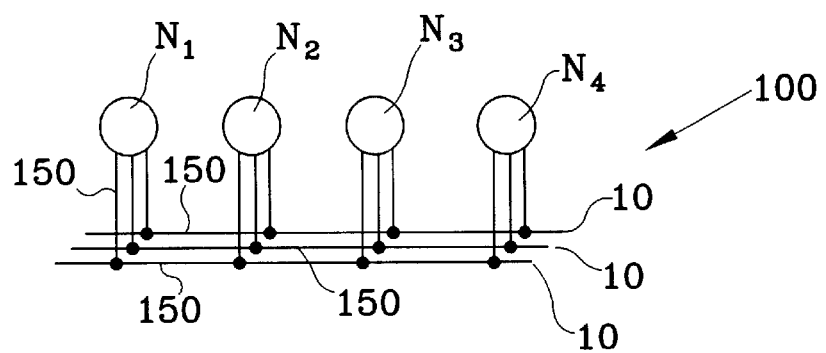
FIG. 8 is a schematic diagram which shows a triplex bus.
Figure 9:
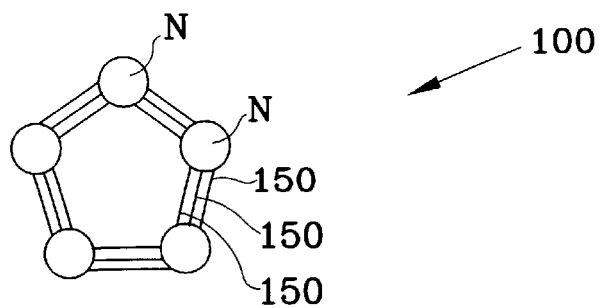
FIG. 9 is a schematic diagram which shows a triplex ring.
Figure 10:
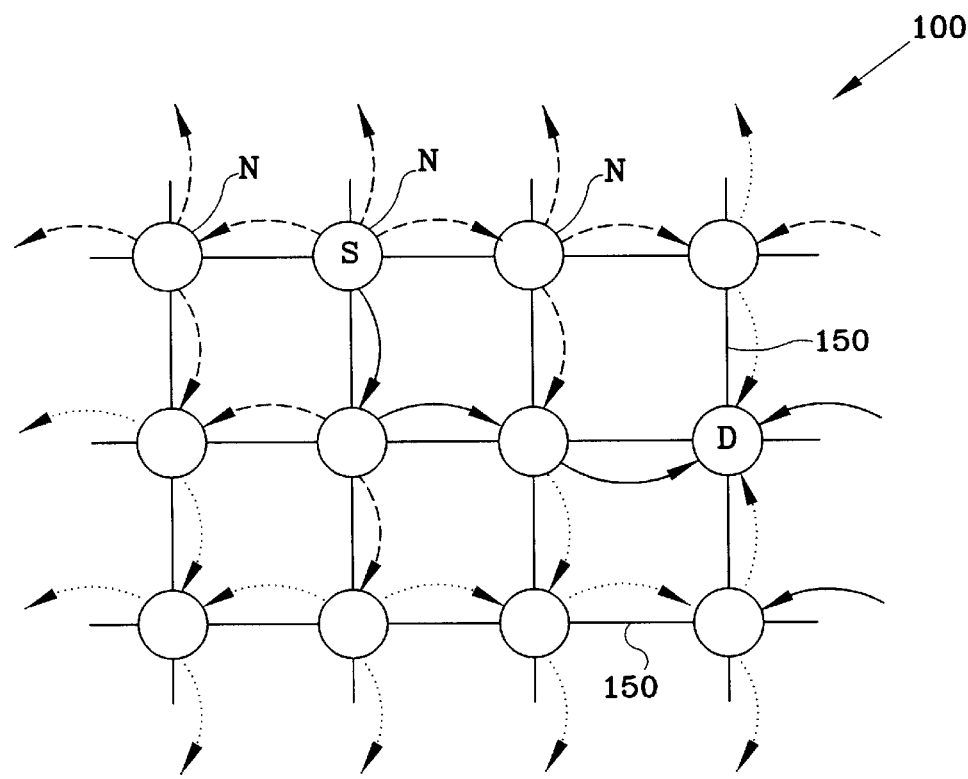
FIG. 10 is a schematic diagram which shows the propagation pattern of a meshed network.
Figure 11:
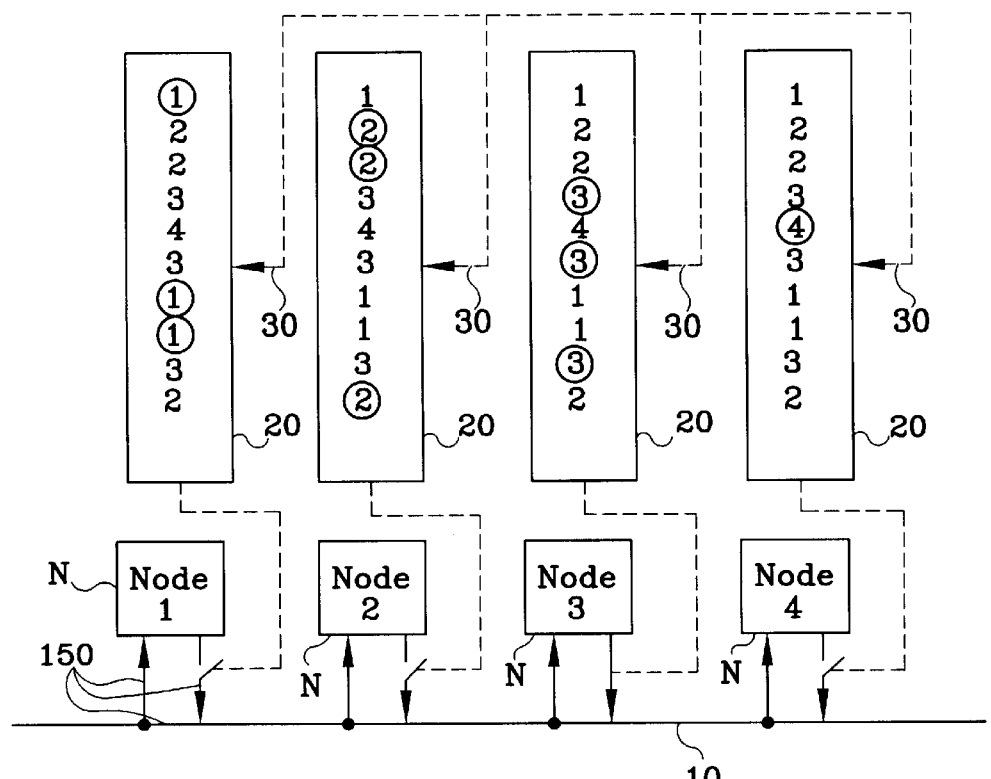
FIG. 11 is a schematic illustration of a sequencing table in a TDPA protocol.
Figure 15:
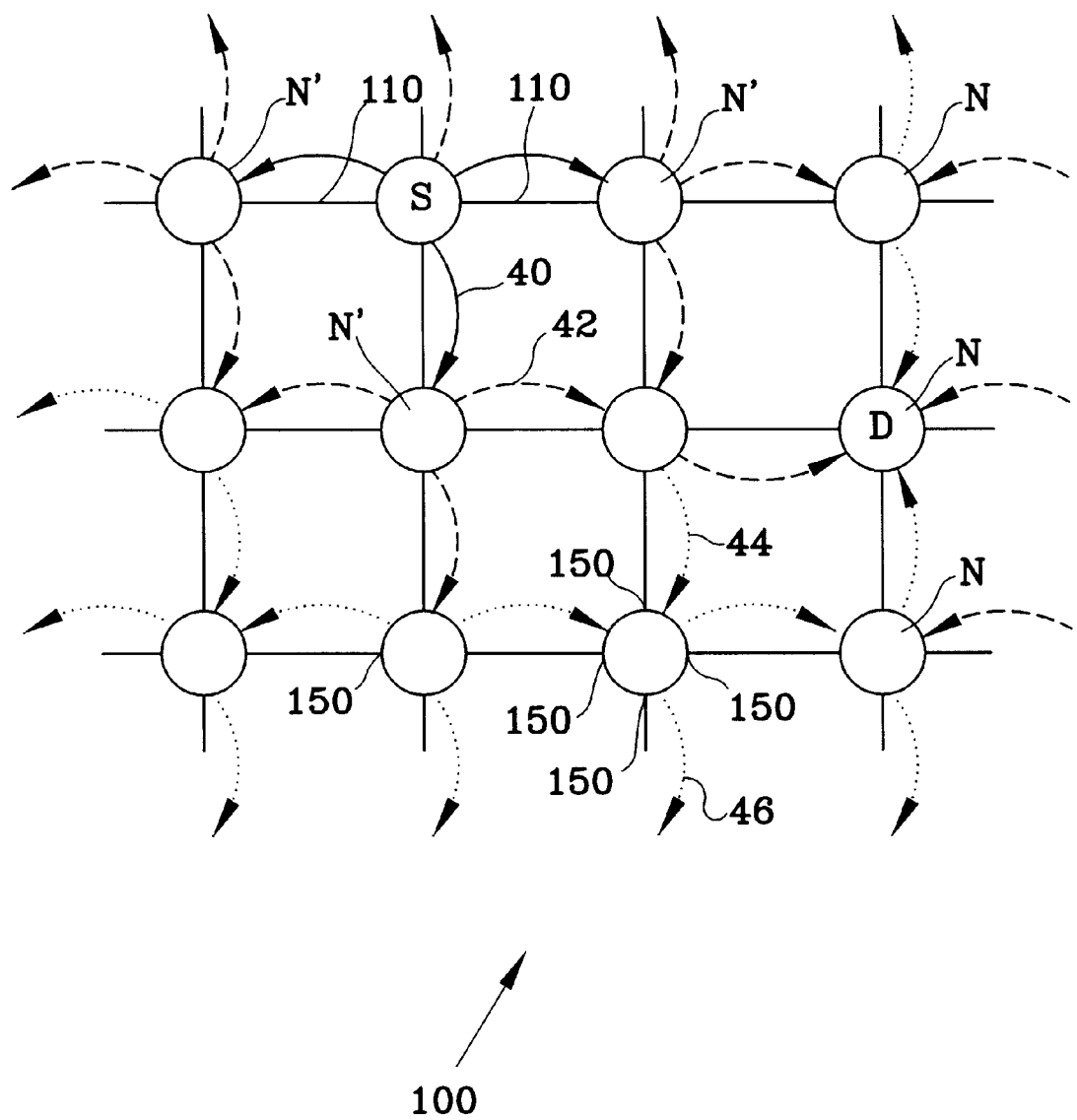
FIG. 15 is a schematic diagram which shows the propagation sequence of a meshed network.

The present invention uses a unique data transfer protocol and related mechanisms to obtain an accurate, timely, and reliable level of usage on a mesh topology. FIG. 15 shows a network 100 having a plurality of nodes N which are interconnected by a plurality of cables 110 which form links 150. The nodes are representative of any communicating electronic components; including various components connected in a single computer, a plurality of computers connected together, or any plurality of components connected to form a system. Each Node N will have a receiver and a transmitter of some type integrated into it. The cables 110 can be any type of electrical interconnection, including wire connectors or fiber optic cable.

The current network 100 uses a flooding protocol to deliver information from one Node N to another. When a particular Node N wishes to transmit information to a particular destination, it starts transmitting the message to all of the nodes N it is connected to. For example, in FIG. 15 Node S wishes to transmit a signal to Node D. That message is first sent to its immediately connected neighbors (identified as N') and is represented by the solid arrows 40. Immediately upon receipt of the first bit of information, all of the receiving nodes begin to retransmit the message to their neighbors. That is, the current protocol retransmits the entire message bit by bit through each Node N, rather than waiting for the entire message to be received before commencing retransmission or simply using the flooding parameters to establish a single path. Once the first data bit is received by the connected nodes N', they retransmit that bit. This second level transmission is represented by the dashed arrows 42. Once this second tier of nodes N receives that first bit, they retransmit it. This third level transmission is represented by the dotted arrows 44. When this third tier of nodes N receives the first bit of information, they retransmit it. This fourth level of transmission is represented by the dotted and dashed arrows 46. This process continues until all of the nodes N, including Node D, have received the particular bit of information. Immediately after sending the first bit of information, Node S sends the second (concatenated and continuous to the first), then similarly the third and so on, until the entire message is sent. Therefore, the entire message is sent, bit by bit, through each Node N in the system.

To avoid the problem of multiple messages being promulgated simultaneously and causing failures, a single Node N is selected to transmit for a given period of time. The selection of this Node N is discussed later. The remaining nodes then perform the following steps. First, all non-transmitting nodes N are set to listen for an incoming message on all links. Second, if an incoming message arrives on any link that link is then selected as the source. If two messages arrive simultaneously on different links, one message/link is selected as the source. Third, rebroadcast the input to all other links 150 while simultaneously locking out any other input. Fourth, at the end of the message, unlock all the links and go to the First step.

Figure 16:
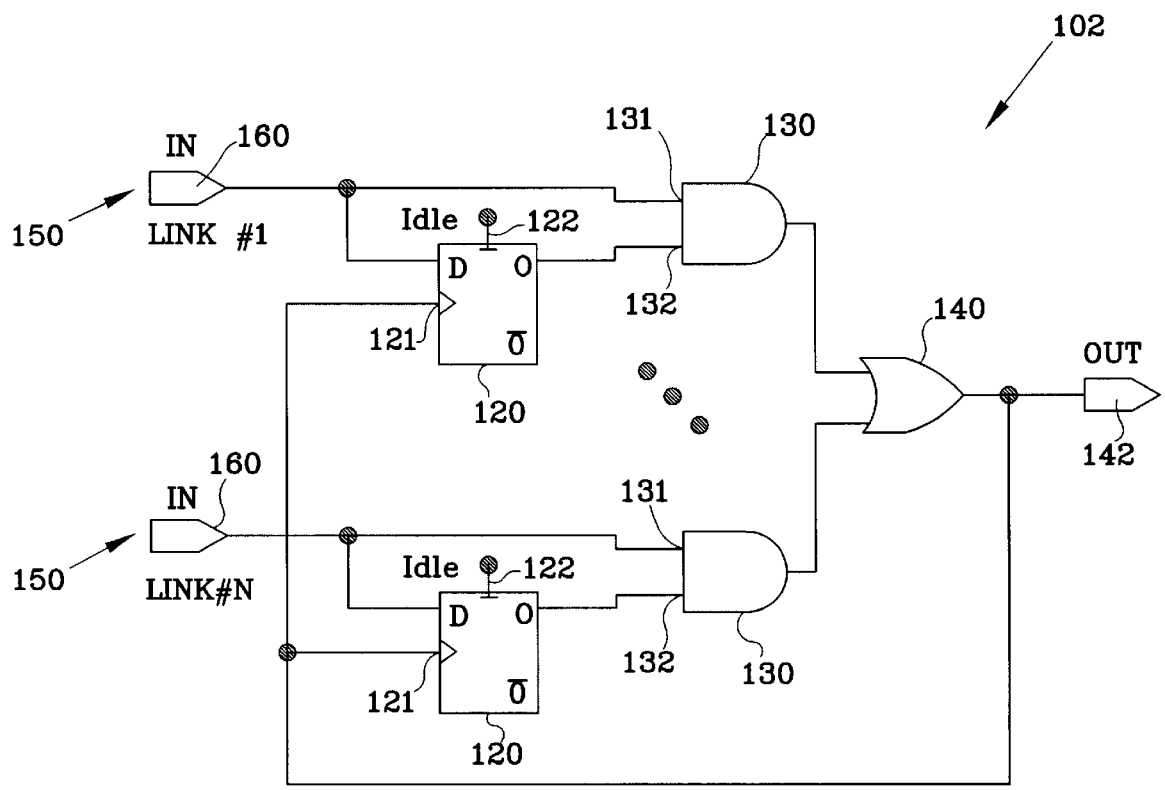
FIG. 16 is a circuit diagram of one embodiment of an arbitration and lockout logic circuit.

As discussed above, problems have occurred in the past when a Node N receives two messages at or about the same time and the electronics cannot distinguish between them. In this situation, the Node N has one or more components which can become metastable. This condition can cause neither message to be selected, so both are lost; or both messages to be selected with the output being some inconsistent mix of the two, and can even cause hardware damage. To overcome these problems, a metastability immune arbitration and lockout logic (A&LL) is employed in each Node N. One configuration for this circuitry is shown in FIG. 16.

In the various other Figures, each Node N is shown having four links 150 to the other nodes N. This particular number of links 150 is arbitrary and may be more or less dependent upon the end use of the system. The circuitry of FIG. 16 shows two links 150 of a single Node N. For each additional link employed, the circuitry will be repeated, as understood by those skilled in the art.

The A&LL circuitry 102 of FIG. 16 works in the following manner. When any given link 150 is idle (i.e., no message is being received) the link 150 is maintained in a listening state. For this particular A&LL, all messages within the communication system will begin with a "1." When a "1" is received, the link 150 is set to a receiving state. Whenever a Node N enters the idle state, an idle input 122 is pulsed to set the flip-flops 120, so that a "1" (high logic output) is maintained on the Q output of each of the flip-flops 120. When the first bit of data from the message arrives at an idle link input 160, it travels directly to a first input 131 of an AND gate 130. Since the "idle" flip-flop 120 has a "1" on its Q output (which is coupled to a second input 132 of AND gate 130), and the link 150 also has a "1" present, which is coupled to the first input 131, a high signal is present at the output of AND gate 130. This "1" is then presented to an OR gate 140.

The output of the OR gate 140 then becomes the output 142 for that particular Node N, and hence is the signal generated on all of that node's N output links 162. The signal from the OR gate 140 is also simultaneously returned to the clock input 121 of all of the flip-flops 120 in that particular Node N. When the clock signal arrives at the clock inputs, only the link 150 having first received the message will have a "1" on the D input of its flip-flop 120. The remainder of the flip-flops 120 will have a "0" (low logic signal) on their D inputs. As such, when the clock signal from the OR gate 140 is received, these flip-flops 120 will produce a "0" at the Q output. This "0" on the Q output is then presented to the related AND gate 130. This will cause each AND gate to have its output stay at "0." As such, these flips flops (and hence their associated links 150) will have no effect on the output of the Node N for the remainder of the message.

The link 150 first receiving the message and having a "1" at its D input at the time the clock signal goes high, since it continues to have a "1" at its Q output, will pass the entire message through the AND gate 130, and ultimately through the OR gate 140 as the output 142 of the Node N. At the end of the message, the idle input 122 is tripped, thus resetting all of the links 150 and their flip-flops 120 to the listening mode wherein all will have a "1" on their Q output.

In this manner, only the link 150 first receiving a particular message will be able to affect the output of the Node N. All other inputs effectively will be ignored.

There is some finite probability that two different links 150 in the same Node N will receive a message simultaneously or within a small window of time, historically creating a problem for the Nodes. This creates a potential problem as the alternate links will not yet be "locked out." For two signals to arrive "simultaneously" and this condition to exist, they must each reach their respective links 150 within the minuscule time window defined by the sum of the AND and OR gate delays minus the flip-flop 120 set up time.

When two signals arrive simultaneously, they will necessarily be the same message (as explained later). Therefore both flip-flops 120 and ultimately both AND gates 130 will be actively outputting the same signal. Since these signals passing through an OR gate 100 are identical, the final output 142 of the Node N will be virtually unaffected. That is, the correct message will be output by the Node N.

Now, if a message arrives at two or more links 150 relatively close together in time but not simultaneously, there is a possibility that one (or more) of the flip-flops 120 will become metastable. Referring again to FIG. 16, assume a message, starting with a "1", arrives at the top link 150. As described above, the "1" will pass directly to the first input 131 of the AND gates 130. Since the flip-flop 120 was idle and a "1" is present on the Q output, both inputs to the AND gate 130 are "1." Consequently, a "1" is passed to the OR gate 140. The OR gate 140 outputs a "1" which then comes back to clock the flip-flops 120. Now, also assume that while this is occurring, the message is arriving at the lower link 150. This message will also start with a "1", therefore this pulse is traveling to the D input of the flip flop 120. When the clock signal reaches the lower flip flop 120, its D input may be changing from a "0" to a "1" resulting in something other than a "0" or a "1", i.e., a half pulse. This may cause the flip-flop 120 to become metastable. The output of a metastable flip-flop is indeterminate. It may be a "0", a "1", a value in between a "0" and "1", or oscillate among multiple values. As long as it is the same message being received by both links 150, it is irrelevant that the lower flip-flop 120 is metastable, because the upper flip-flop 120 will not be metastable and will pass the message through its AND gate. If the metastable lower flip-flop 120 happens to oscillate such that an output is produced from its AND gate, no harm results because a "0" will not effect the output of the OR gate and a "1" can only occur when the upper AND is also a "1".

To achieve the above result, it is important that when two messages are received simultaneously or nearly simultaneously, that they be the same message. If nodes N are simply allowed to independently generate messages at any given time, there is a likelihood that two different messages could arrive simultaneously at two different links 150 of a single Node N. If this were to occur, a spurious message would be generated by that Node N and subsequently transferred on. Therefore a protocol should be established to delineate when any given Node N should be in a transmit mode. This protocol can be any of the bus media access control (MAC) protocols well known in the art.

Figure 17:
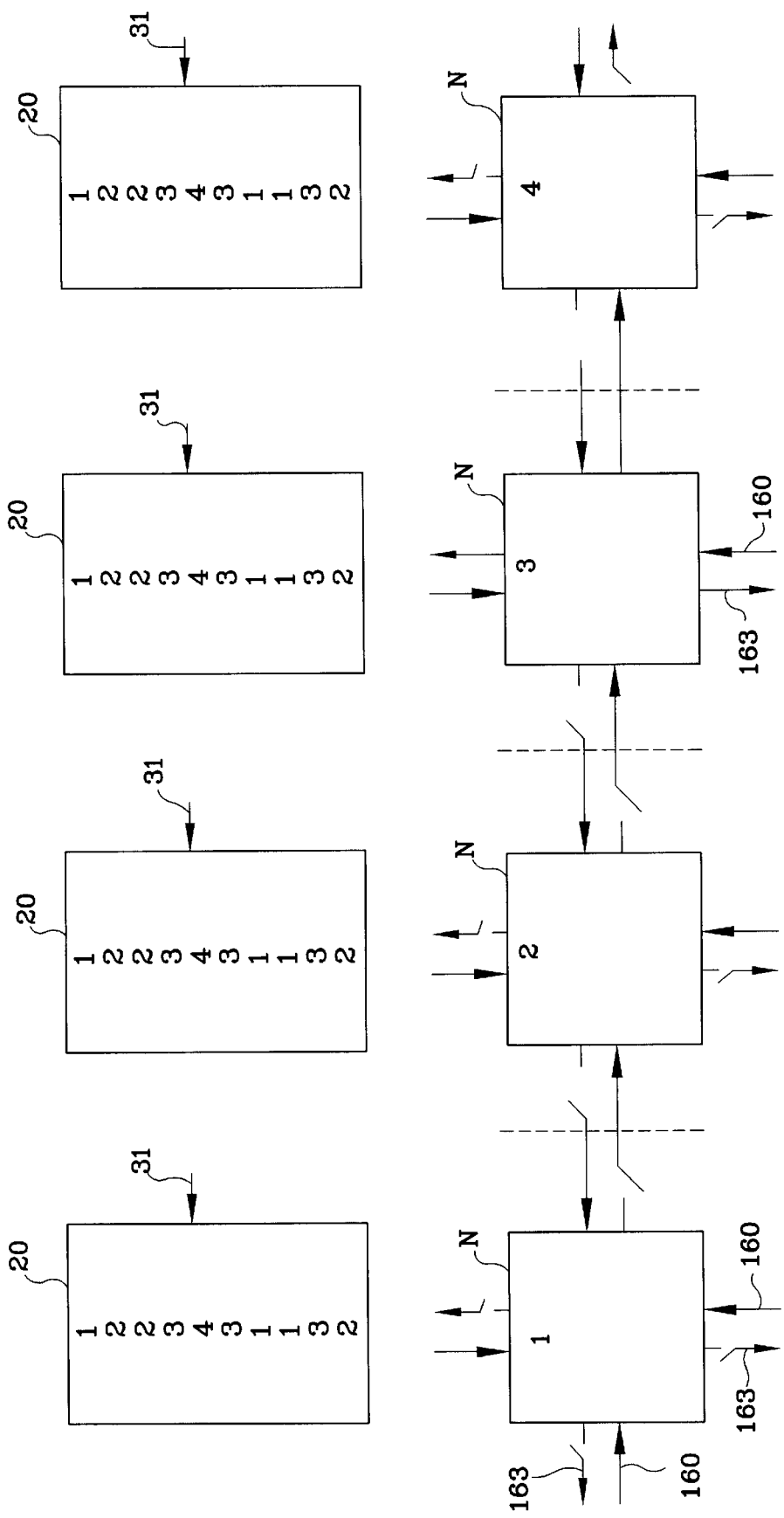
FIG. 17 is a schematic diagram which shows a plurality of nodes and their associated tables.

As discussed above, one way of doing this is to use the Table Driven Proportional Access (TDPA) protocol. Referring to FIG. 17, four meshed nodes N are shown as Nodes 1–4. Above the nodes N, their respective tables 20 are shown schematically. This would, of course, be an internal function using a locally replicated table within each node. The tables 20 delineate when any given Node N may transmit a message. If a Node N is not designated as transmitting, it is set to receive or "listen" for incoming messages. As shown in FIG. 17, Node 3 is currently designated as the transmitting node. Nodes 1, 2 and 4 (and any other connected nodes) will wait a specified period of time for Node 3 to send a message. The time based pointer 31 determines that Node 3 is enabled. This time based pointer 31 simply steps through the table 20 in a sequential order, and when the end is reached, starts anew at the beginning of the table 20. The ordering of the nodes within the table is arbitrary and any sequence may be selected, so long as each nodes' table coincides.

There are various ways to advance the pointer. Each Node N may simply be given a predetermined amount of time to transmit a message. The selected node may transmit or remain silent, while the remaining nodes N are set to receive for that time period. When that time period is done, that Node N simple ceases transmission and the time based pointer 31 advances in each node. Alternatively, data could be included as an End of Message (EOM) indicator. Thus, the transmitting Node N, would transmit its entire message, no matter the time period. When that message is completed, the EOM will cause the pointer (no longer time based) to advance to the next Node N in the table 20. This is not a preferable protocol, however, as it not possible for all of the nodes N on the mesh to simultaneously perceive the EOM and special measures must be taken for the protocol to continue even if one or more nodes have failed. Current mesh protocols (as well as many bus protocols) do use the EOM indicators to account for slow drifts of individual clocks in each Node N which occur with the time based protocol.

In a preferred embodiment, a time based pointer 30 is used with the TDPA protocol, while also including an additional data segment in each message. This data segment will indicate the number of links traveled by the message. As discussed above, with each tier of nodes N that the data travels through, a time delay is added (from the point of original transmission). By knowing how many tiers the information has passed and knowing the delay caused by each tier, each Node N can calculate the time of the original transmission. Therefore, the time based pointers 30 of the various receiving nodes N will be correctly calibrated with that of the transmitting Node N. To accomplish the addition of this data segment, a field is added to the message, which counts the tiers it traverses. The count is incremented as it passes through each Node N with a serial one-bit adder such that no additional delay is caused by the counter is caused by the counter itself. If the delay is not uniform from link to link, the serial adder at the receiving end of each link can add to the count a number that is proportional to the delay of that link.

Referring again to FIG. 17, only four nodes N are shown and the table 20 only accounts for these four nodes N. Obviously, as additional nodes N are added, they must be accounted for in the table 20. As indicated, Node 3 is currently the transmitting Node N. This is represented by a solid arrow 162 outputting from Node 3. All of the outputs from the other nodes N are shown as an open arrow 163. It should be noted that Node 3 is transmitting in all four directions, thus any added nodes N, above and below Node 3 would also receive the message. Once a single bit of information is received by any of these nodes N, it is immediately repeated. Therefore, as represented in FIG. 17, there exists a distinction between a node's capability to transmit an original message (broadcast in four directions) and to simply repeat a received message (broadcast in three directions).

Figure 24:
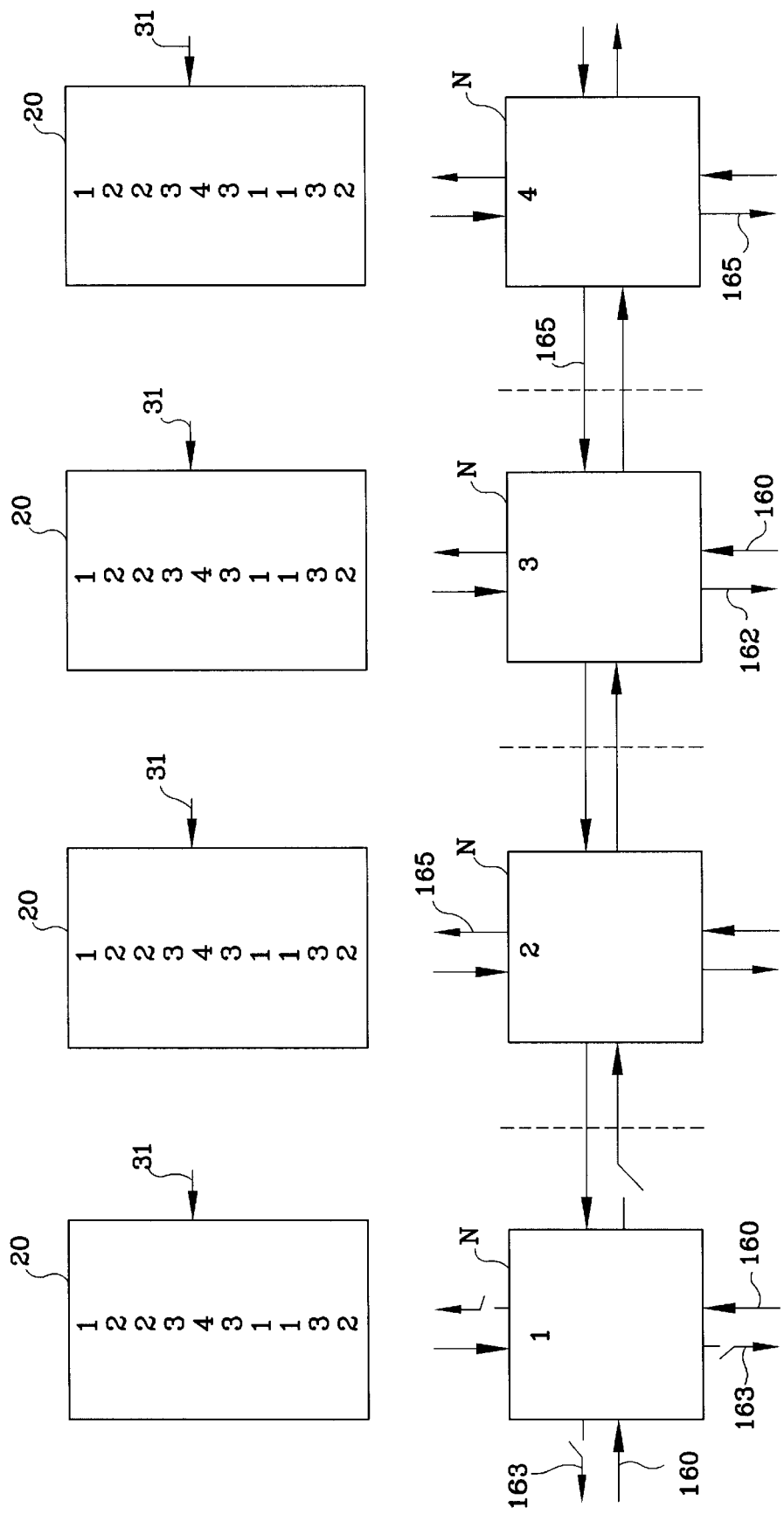
FIG. 24 is a schematic diagram that shows the same nodes 1–4 as FIG. 17.

FIG. 24 shows the same Nodes 1–4 as in FIG. 17, only now some minuscule amount of time has passed. Node 3 has successfully transmitted the first bit of its data message to Nodes 2 and 4. Immediately upon receipt of that data bit, Nodes 2 and 4 retransmit that data bit on all of their outgoing links 165. Links 165 were previously open arrows, and are now solid indicating that they are rebroadcasting a received message. The outgoing links 162 of Node 3 continue to be solid arrows because Node 3 is sending the second and subsequent data bits of the particular message. The outgoing links 163 of Node 1, remain open arrows because Node 1 has not yet received a data bit to rebroadcast and it is not designated by the table 20 as being able to transmit an original message.

Figure 18:
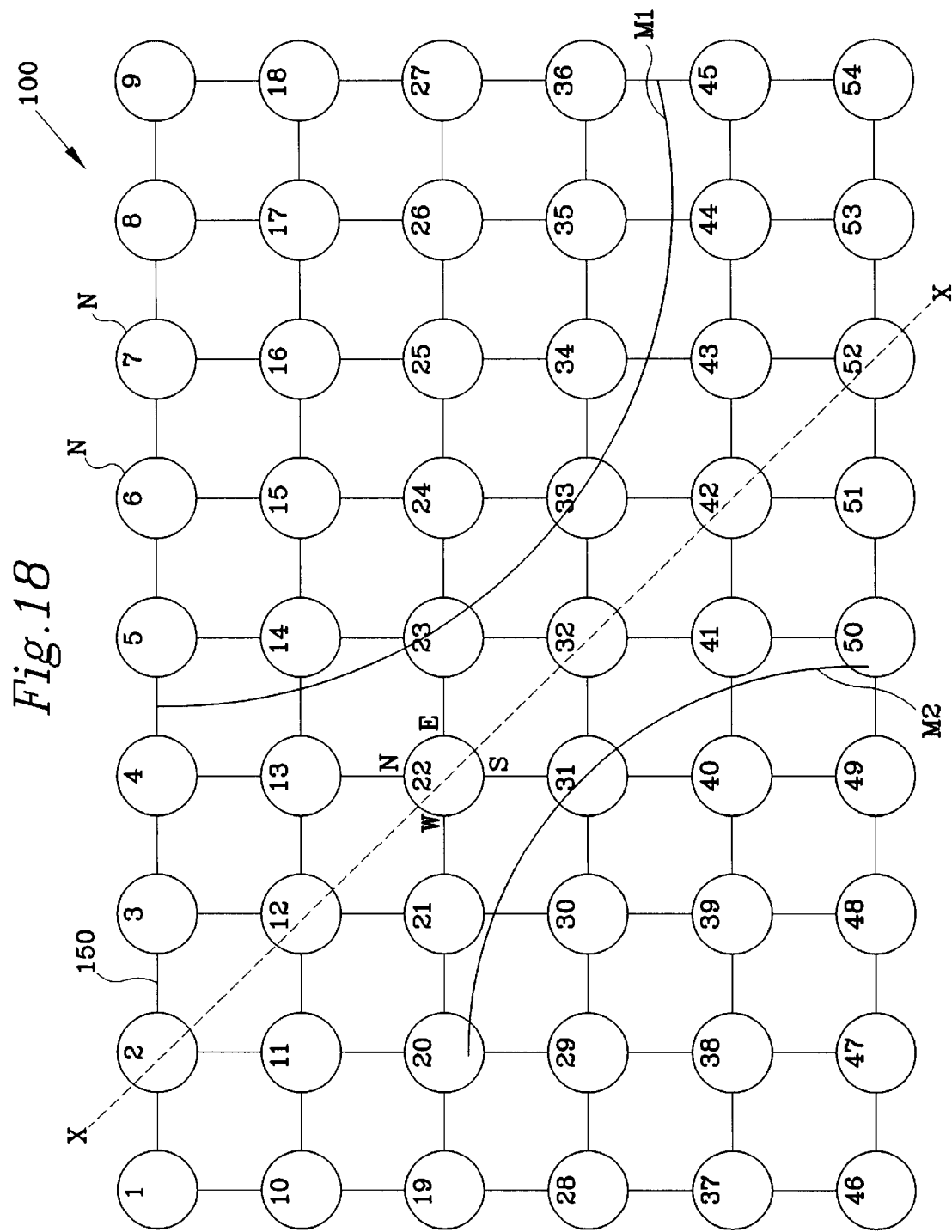
FIG. 18 is a schematic diagram which shows a meshed network having two submeshes.

Everything described above refers to a single Node N on the mesh transmitting and every other Node N receiving (and repeating). The mesh is, however, capable of handling multiple messages simultaneously. Referring to FIG. 18, a mesh having 54 nodes is shown. This mesh is capable of working as described above, i.e., a single transmitting node while every other Node N receives and repeats. In addition, each individual Node N is capable of handling two separate messages simultaneously. For the sake of clarity, these will be described as message 1 and message 2. Any number of submeshes can be defined within the overall mesh. Then a single Node N in each submesh can transmit simultaneously with another Node transmitting in another submesh. For instance, an artificial boundary, defined by the dashed line X—X divides the mesh diagonally in half. The boundary can be defined in any shape or configuration to create any number of submeshes. These submeshes need not be physically contiguous. Nodes N entirely within any submesh will behave exactly as described above, that is any message received on a link 150 will be repeated on all links 150. The advantage to establishing submeshes and transmitting multiple messages simultaneously, is the increase in bandwidth which results. This capability is not available with standard buses.

Those nodes N which lie on the boundary must be configured to handle two different messages. Any given Node N, has four links plus its local connection. Referring to Node 22, the links are designated as North, South, West and East. In the example shown by FIG. 18, line X—X divides the mesh into a right submesh and left submesh. Therefore any message transmitted by a Node N in the right submesh must stay within the right submesh. To accomplish this, those nodes N along the boundary X—X have a specific link connectivity. For example, any message coming in from the North will only be transmitted to the East, and vice versa. Any message coming in from the South will only be transmitted to the West, and vice versa. It should be noted that the Node N can handle two different messages simultaneously. Various boundaries may be established so that any two links may be coupled as described. In FIG. 18, message 1 (M1) approaches Node 22 from the right. Message 2 (M2) approaches Node 22 from the left. Assuming M1 arrives at the East link, Node 22 will only repeat this message on the North link. Also, and possibly simultaneously, M2 will arrive at the South link, and will then be repeated only on the West link. To accommodate this, the A&LL logic is replicated, one replicant for each message to be handled simultaneously. The various link configurations attach incoming and outgoing links to the A&LL replicant for the particular submesh to which the link has been assigned.

The above-described arrangement could be a permanent division of the mesh, however it would preclude the use of the full mesh. A preferable embodiment is shown in FIG. 19, which depicts a hybrid portion (Table 22) of the TDPA table 20, which was used to designate which nodes within a system can transmit. Table 22 includes an additional byte of data, which would be added to the above-described TDPA table 20. Now, table 20 would be defined so that at certain times, multiple nodes N would be able to transmit at the same time, as long as each was in a separate submesh. At other times, only a single Node N may transmit. In FIG. 19, table 22 is applied to Node 22 of FIG. 18. In the table 22, the first entry indicates that Node 15 and Node 38 will transmit at the same time. Therefore, the four links of Node 22 must be set to accommodate this. Node 22 lies along the artificial boundary (X—X) established. Message 1 is designated by zeros and message 2 is designated by ones. The first four bits of the byte in table delineate which message is received and the last four bits designate where that message is repeated. As can be seen, North and East are set to message 1 and South and West are set to message 2. Once the time period for those messages has elapsed, the time based pointer 31 advances to the next table 20, 22 entry, which happens to indicate that Node 26 will be the only Node N transmitting. As such, all links are set to receive this single message by setting North, South, East and West to the same message. The byte representing this arbitrarily consists of all zeros. After the time period for this message is elapsed, the time based pointer 31 advances once again, indicating that Node 6 and Node 19 will both be transmitting. Therefore, the artificial boundary is again established. In this way, the entire mesh is used at times and at other times, submeshes are established. Any combination of the two is feasible. This feature is particularly beneficial when it is known that certain nodes will communicate only with other known segments of the mesh.

Figure 20:
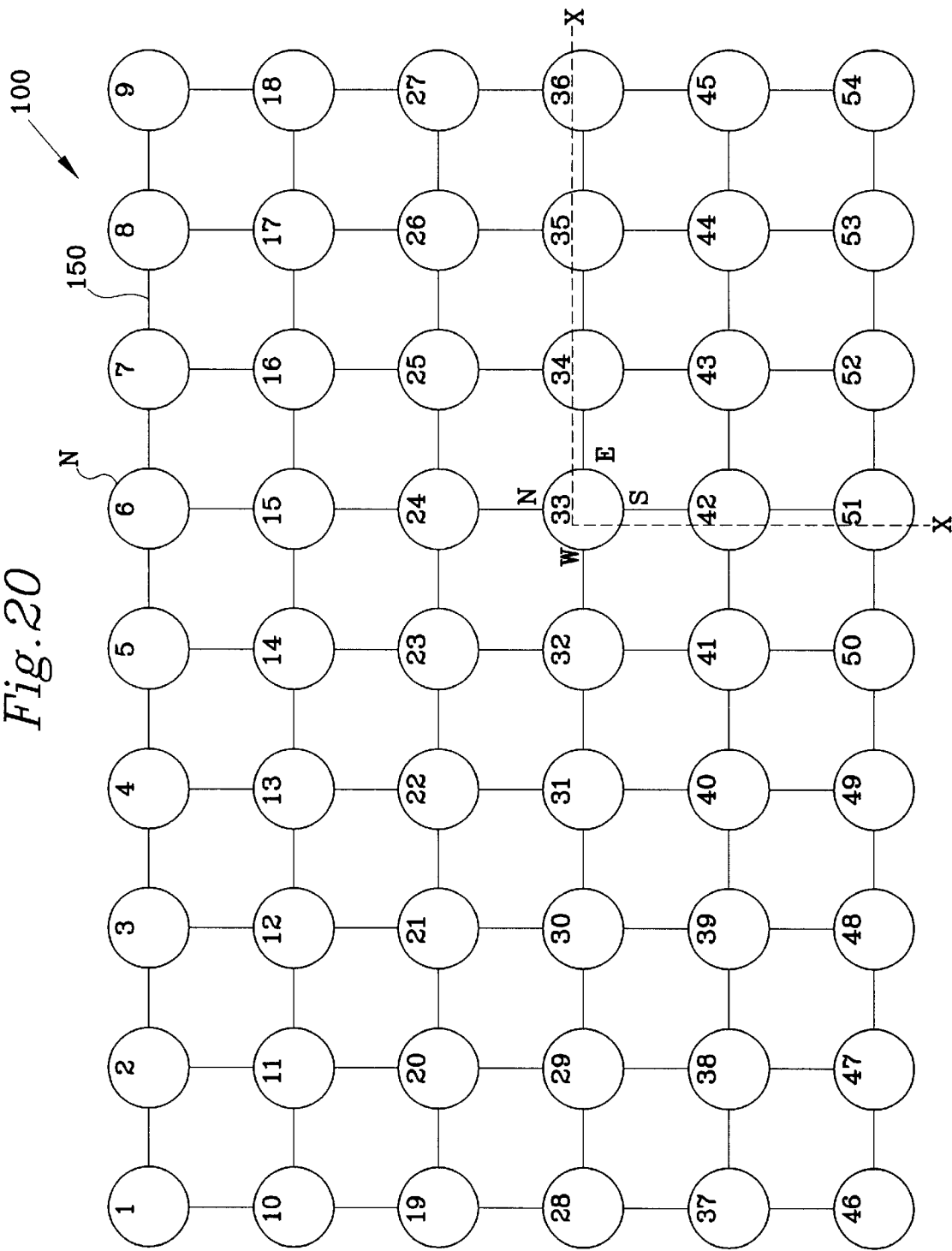
FIG. 20 is a schematic diagram which shows a meshed network having two submeshes.

FIG. 20 shows another possible submesh combination of a 54 node mesh. Dashed line X—X designates a submesh in the lower right hand quadrant. The links of node 33 have been designated as North, South, East and West. Table 24 in FIG. 21 indicates the protocol for this mesh/submesh combination, and will function similarly to table 22. As such, a detailed explanation will be omitted except to note that now the North and West links communicate and the South and East links communicate when nodes in different submeshes transmit simultaneously.

These two submesh examples could be implemented in the same table such that for some table entries, a left/right boundary is established and for other table entries, a quadrant boundary is established. A table may contain any number of submesh connectivities. For example, another table entry may divide this mesh into 27 submeshes each consisting of just two nodes. Because communication need not be bi-directional nor simplex, some table entries could divide the mesh into 54 submeshes, each submesh with one transmit and one receiver node, and with each node acting as a transmitter for one submesh and a receiver for another.

A major advantage of the present invention is that a mesh can be used in a reliable and real-time manner. The advantage of a mesh itself is the inherent fault tolerance that it creates. Namely, if any particular link 150 is severed, there are a plurality of alternate paths available. Furthermore, if a Node N ceases to operate, a message is able to bypass it entirely and still be received at its destination via the remaining nodes N. There are times when this process needs to be reversed. Namely, when a bad Node N or severed link is repaired, or a new node is added to the mesh, the protocol must account for the added connections. By simply connecting or reconnecting the links 150 to a Node N, data will automatically be transmitted when received, etc. The issue which remains is how the new or rejoined node is synchronized within the parameters of the TDPA timing. That is, the time based pointer 31 for the new or rejoined node must be synchronized with the remainder of the nodes on the mesh.

In the present invention, when a Node N is added or rejoined to the mesh, the Node N will wait for an intermessage gap (the idle time between messages). When the next message arrives at that node, it is examined for a synchronization field, which contains the table pointer for that message. Alternate embodiments may have either every message or only some messages contain a synchronization field. For the latter embodiments, the node repeats examining messages until it gets a message with a synchronization field. At this point, the Node N will know which entry in table 20 corresponds to the current message.

Figure 22:
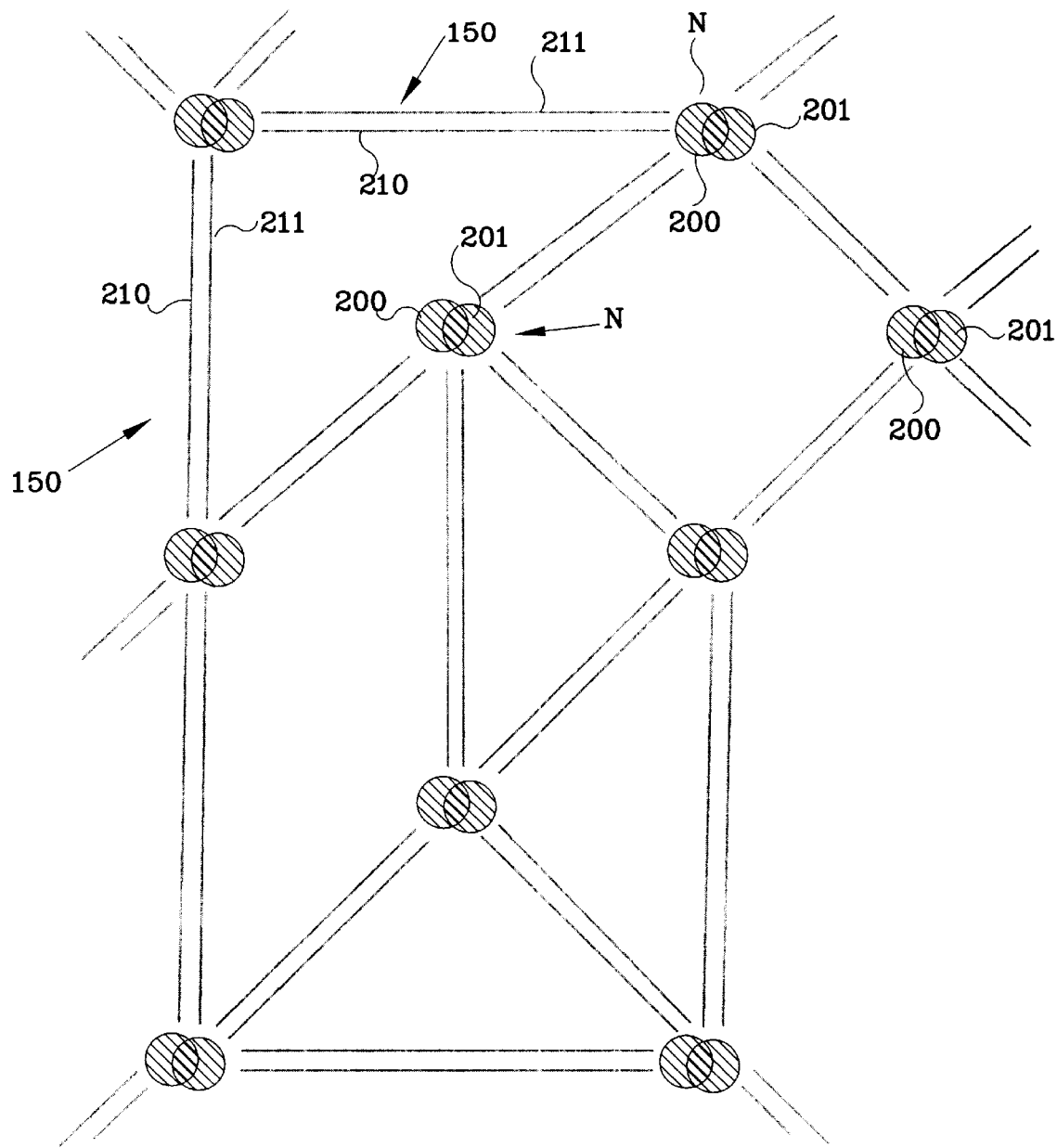
FIG. 22 is a schematic diagram which shows a meshed network having self checking pairs.

As mentioned throughout, the mesh flooding protocol will provide the system with a high degree of fault tolerance in the form of availability, however this system alone will not necessarily provide any measure of integrity. That is, there is no way to determine whether the correct message is being received intact or whether some degree of corruption has occurred. To give the system this integrity, FIG. 22 incorporates the concept of self checking pairs. With this concept, everything is duplicated. For each Node N, there are really two combined nodes 200, 201. In addition, for each link 150 there are two data lines 210, 211. This is substantially different from the duplexing and triplexing of bus lines discussed above. There, the additional lines were added to provide another path, should one path become severed as well as providing redundant paths for integrity checking. Here the idea is to separate the availability and integrity mechanisms; giving availability and integrity levels which meet or exceed the most demanding requirements while using less hardware then conventional fault tolerant networks. To provide integrity, both data lines 210,211 will transmit the same message at the same time and the two separate nodes 200,201 will each receive a message from one of the data lines 210,211. Then, the two nodes 200, 201 will do a bit for bit compare between the messages received via data lines 210,211 respectively. The self checking pairs incorporate a comparing circuit to perform this function. If both messages are the same, they are deemed reliable. If one message differs from the other, something has gone awry and that particular message pair is ignored. Now this particular Node N will not rebroadcast the corrupted message. A node may flag a miscomparing link as faulty and prevent it from participating in subsequent A&LL arbitration until such time as the link (and the node pair that transmits through it) has been proven that it can resume correct operation. However, since the mesh is still inherently fault tolerant, therefore until the corrupt node or link is repaired, the message will simply bypass the Node N through the above described routine.

The self checking pairs can prevent a babbling node from jamming the network. The probability that both nodes in a pair will both babble is extremely remote. The probability that they will babble the same erroneous data at the same time is incalculably small. The TDPA mechanism provides another means for confining a babbling node, even when self checking pairs are not used. Babbling nodes will have only certain time windows in which it is legal for it to transmit. Neighboring nodes know these times. When a babbling node transmits outside its assigned windows, the neighboring nodes can detect this and prevent the babbling node's links from further participation in A&LL arbitrations, effectively removing the node from the network.

Figure 23:
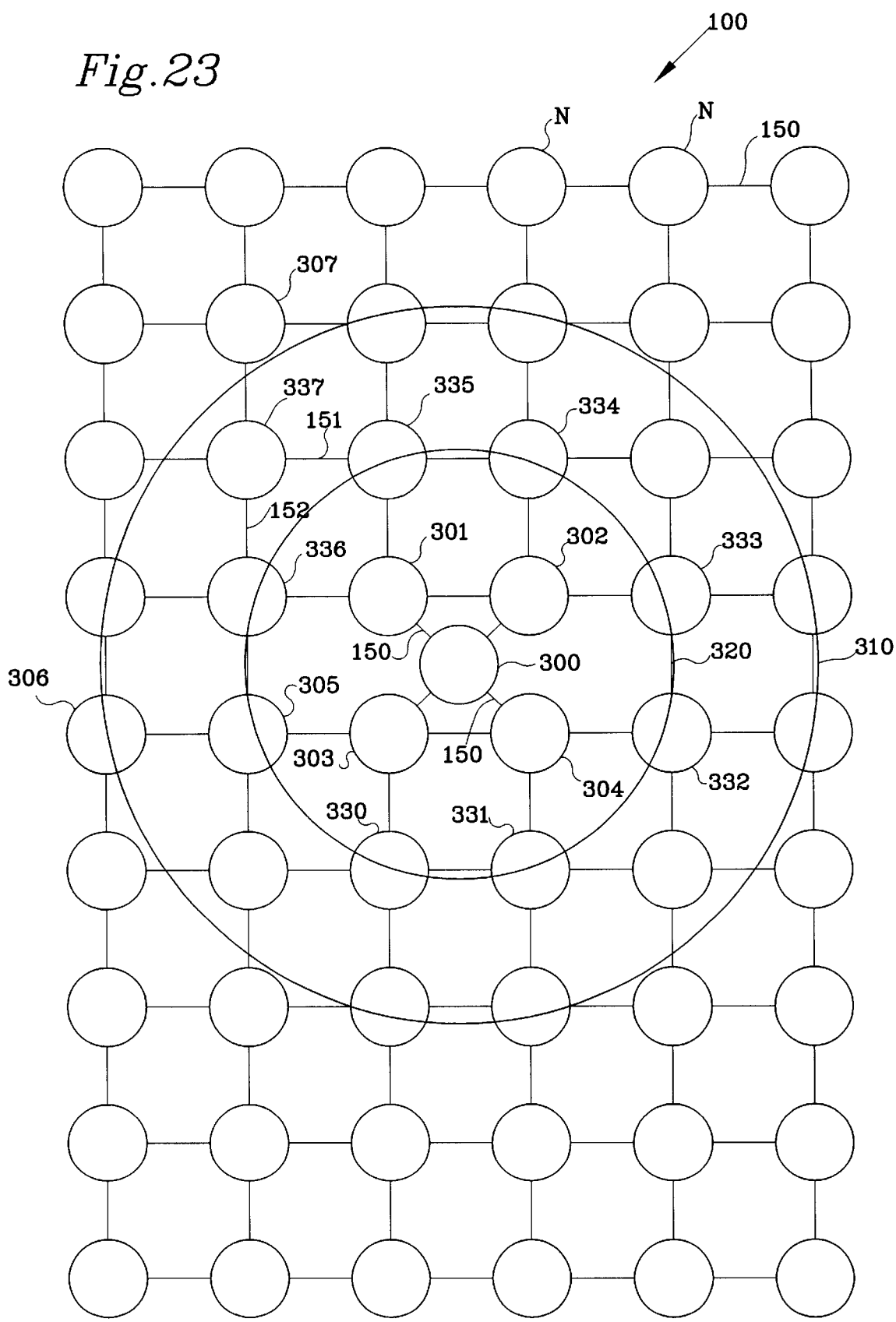
FIG. 23 is a schematic diagram which shows a meshed network along with the propagation of a data signal.

Referring to FIG. 23, the protocol of the present invention will be summarized. FIG. 23 shows a 55 node mesh having node 300 as its center. Each Node N has a table 20 integrated into its hardware or software. At some point in time, the pointer 31 of table 20 will advance to the point where node 300 is designated as the transmitting Node N. At that point in time, if node 300 has a message to generate, it will begin transmitting that message bit by bit. In FIG. 23, assume node 300 has a message to transmit. The first bit of that message is sent out on all four of its connected links 150. That first bit is then received by one link of each of the nodes 301, 302, 303, and 304. This represents tier 1. Since there is no possibility of any other Node N transmitting at this time, that will be the only link 150 on nodes 301, 302, 303, and 304 which happens to receive a message at that time. Therefore, the other three links 150 of nodes 301, 302, 303, and 304 are "locked" out, that is no incoming messages will be accepted. Immediately, those four nodes 301, 302, 303, and 304 retransmit the first bit of that message. Therefore, nodes 301, 302, 303, and 304 transmit the first bit to nodes 305, 330, 331, 332, 333, 334, 335 and 336. Nodes 301, 302, 303, and 304 may also transmit the message back to node 300, but node 300 will not be able to receive it. Hence, infinite propagation is avoided. The same will occur in outlying receiving nodes. That is, a node may transmit the message it just received to the node which just sent it. The transmission is allowed, but reception by the earlier node is precluded because of the A&LL circuitry. (In an alternate embodiment, nodes include circuitry to inhibit transmitting the message back to its immediate source, to conserve power.)

This will establish tier 2. Since the data bit has past through tier 1, some delay has been added by passing through the Node N. This time delay is indicated by sequentially counting the number of tiers so the tier count would now be 1. This time/delay factor is used to correct for propagation delays in the synchronization of the pointers, which sequence the entries of the TDPA table 20. There is some possibility that multiple links 150 of nodes 305, 330, 331, 332, 333, 334, 335 and 336 will receive the message bit at the same time, however this possibility is remote and will not be addressed here. Such a situation would be handled in the manner described below. Assuming only one link 150 receives the message in nodes 305, 330, 331, 332, 333, 334, 335 and 336 that link will be the only one receiving. This first bit of the message will continue to be passed on in this manner until all 54 of the receiving nodes have received the bit. They need not all be described in detail. If any given link or links 150 happen to be disabled, the signal will simply bypass them.

Assuming a normal working environment, nodes 335 and 336 should receive the first bit at the same time. If the nodes 335, 336 process at the same speeds it is very possible that the first bit will be transmitted to node 337 along two different links 151,152 at the same time. As described above, node 337 will have an A&LL circuit to handle this. If the bits arrive at links 151,152 at exactly the same time, both will be set to receive and both will affect the output of node 337. But, since this is the same message, the output will still be correct. If the bits arrive at links 151,152 offset, but within the setup time of a flip flop 120, then the latter arriving signal may cause that link's (151 or 152) flip-flop 120 to become metastable. This does not pose a problem however, because the other link's (151 or 152) flip-flop 120 will allow the message to be processed and output by node 337. Immediately after node 300 transmits its first bit, it will transmit the second bit and that will propagate following the paths establish by the first bit. At this point, all of the nodes N that have received the first bit are "locked" into a particular mode. The entire message will pass through them bit for bit in that manner. At some point, node 300 will transmit the last bit of the current message. This propagates through the nodes N in the same manner as any other bit. This last bit may or may not coincide with the end of the time period node 300 is allowed to transmit. The data bits will propagate through the mesh much like a wave. The front 310 of the wave represents the first data bit. The end 320 of the wave represents the end of the transmission time period for the transmitting node 300. As the end 320 of the wave pass through successive nodes N, it "unlocks" the nodes again setting them to a listening mode. This would correlate to the A&LL logic tripping the idle input 122 on the flip flops 120. Therefore, in FIG. 23 the message occupies an annulus shaped region of the mesh formed by the front of the wave 310 and the end of the wave 320. As illustrated, the front 310 has just entered node 306, indicating that it has just received the first bit. The nodes outside of the wave, such as node 307 are in a listening mode and have not received any part of the message generated by node 300. Node 300 has transmitted its entire message and the whole message has passed entirely through nodes 301, 302, 303, and 304. As such, these nodes 301, 302, 303, and 304 are now awaiting the next message. Nodes 305, 330, 331, 332, 333, 334, 335 and 336 are receiving the last bit of information or are simply waiting while the node 300 time period lapses.

After some period of time has passed, the pointer 31 in each node's table 20 will advance to the next entry, which specifies which Node N will transmit next. Each node's pointer will be compensated by monitoring the tier count to account for any delays in propagation.

The same process as described above will occur within each submesh established within a mesh. The boundary nodes will be able to handle two separate messages and will route them appropriately.

Of course, the mesh shown in FIG. 23 could have been constructed having self checking pairs to give the system integrity by ignoring corrupt data.

Finally, the mesh propagation systems described above have incorporated a TDPA protocol. Various other established protocols such as CSMA could be adapted to work within the spirit and scope of the present invention. For instance, with CSMA there is no designation as to when a particular node will transmit. Therefore there exists a likelihood that messages may collide. The nature of these collisions is different on a mesh from what it is on a bus. On a bus, the message signals actually collide on the media, causing corrupted messages. On a mesh, each segment of medium (a link) has only one transmitter; so message signals cannot collide and cause corrupted messages. Instead, the collisions occur in the A&LL. With the A&LL collisions, the window of vulnerability is less than for bus collisions and corrupted messages are extremely rare. When this occurs, a jamming signal is sent out to obviate the message. In many respects, CSMA performs better on a flooding mesh than it does on a bus. This system uses an end of message (EOM) indicator embedded within the message or, more often, media idle timers to let each Node N know when the message is complete. This EOM would correspond to the end 320 of the wave in FIG. 23. This system, while functional, is not preferable in systems which require real-time access and control because of the non-deterministic nature of the propagation. That is, collisions and jamming signals add spurious and unpredictable time delays which may adversely affect precisely controlled systems.

I claim:

1. A method for propagating data over a meshed network of nodes comprising the steps of:
  a) establishing a node as a transmitting node for a period of time;
  b) establishing the remaining nodes as receiving nodes for a period of time;
  c) transmitting a data message from the transmitting node along all links connected to the transmitting node;
  d) each receiving node
    1) listening for an incoming message on all of its links and
    2) selecting a message as a source, if it is the only message that arrives on any of its links, or arbitrarily selecting a message as the source, if a message arrives on more than one link;
    3) locking out all links which are not designated as a source, blocking incoming data on locked out links for the remainder of the message;
    4) retransmitting each bit of data on all links, immediately after each bit of data is received by the receiving node; and
    5) unlocking all links when the message is completed;
  wherein the transmitting node is established by:
  a) providing each node in the mesh with an access table, the table having entries indicating which nodes may be allowed to transmit;
  b) providing a pointer within the table, the pointer indicating which nodes may transmit at a particular time; and
  c) allowing the pointer to sequentially step through the table entries to allow different nodes on the mesh to transmit.

2. The method of claim 1, wherein the pointer within the table is time based and sequentially steps through each entry after a predetermined amount of time has lapsed from the previous step.

3. The method of claim 2, further comprising establishing the synchronization and resynchronization of an unsynchronized node by the node;
  a) waiting for the idle time between messages;
  b) receiving and examining the follow message(s) for a synchronization field which contains a value for table pointer corresponding to the current message; and
  c) adjusting the local table pointer to match those of the other nodes.

4. The method of claim 2, wherein the predetermined amount of time may be different for each table entry.

5. The method of claim 2, further comprising the steps of:
  a) incrementing a counter for each tier of nodes the data passes through;
  b) calibrating the counter to represent the time delay incurred by each tier; and
  c) calibrating the time based pointer of each receiving node based upon the counter.

6. The method of claim 5 wherein the submesh specific parameters are established by adding extra data to each entry of the access table which identifies link interconnectivity for each table entry.

7. The method of claim 1, wherein the pointer within the table sequentially steps through each entry after a predetermined amount of idle time has lapsed.

8. The method of claim 1, wherein the pointer within the table sequentially steps through each entry whenever the received data is equal to an end-of-message datum.

9. The method of claim 8, wherein submesh specific parameters are set by temporarily coupling the links of the node together so that messages received from a first submesh are only retransmitted to the first submesh and messages received from a second submesh are only retransmitted to a second submesh.

10. The method of claim 1, wherein the step of establishing a transmitting node includes:
  a) establishing a plurality of submeshes within the mesh;
  b) allowing one node in each submesh to be designated as a transmitting node; and
  c) setting the nodes lying along the boundaries of each submesh to submesh specific parameters.

11. A method for propagating data over a meshed network of nodes comprising the steps of:
  a) establishing a node as a transmitting node for a period of time;
  b) establishing the remaining nodes as receiving nodes for a period of time;
  c) transmitting a data message from the transmitting node along all links connected to the transmitting node;
  d) each receiving node
    1) listening for an incoming message on all of its links and
    2) selecting a message as a source, if it is the only message that arrives on any of its links, or arbitrarily selecting a message as the source, if a message arrives on more than one link;
    3) locking out all links which are not designated as a source, blocking incoming data on locked out links for the remainder of the message;
    4) retransmitting each bit of data on all links, immediately after each bit of data is received by the receiving node; and
    5) unlocking all links when the message is completed;
  wherein the step of arbitrarily selecting a message, if a message arrives on more than one link, further includes providing each node with a circuit having arbitration and lockout logic, wherein the circuit:
  a) allows two or messages arriving simultaneously to be logically combined together to form a single, correct output; and
  b) ensures that at least one link provides a correct output if two or more messages arrive at a node so close in time so as to cause one or more elements to become metastable.

12. A method for propagating data over a meshed network of nodes comprising the steps of;
   a) establishing a node as a transmitting node for a period of time;
   b) establishing the remaining nodes as receiving nodes for a period of time;
   c) transmitting a data message from the transmitting node along all links connected to the transmitting node;
   d) each receiving node
      1) listening for an incoming message on all of its links and
      2) selecting a message as a source, if it is the only message that arrives on any of its links, or arbitrarily selecting a message as the source, if a message arrives on more than one link;
      3) locking out all links which are not designated as a source, blocking incoming data on locked out links for the remainder of the message;
      4) retransmitting each bit of data on all links, immediately after each bit of data is received by the receiving node;
      5) unlocking all links when the message is completed;
   e) providing a self checking pair of nodes for every node in the mesh;
   f) comparing the data received by one node of the self checking pair against the data received by the second node of the self checking pair; and
   g) allowing the data to be retransmitted only if the data received by the nodes in the self checking pair matches.

13. The method of claim 12 wherein several bits are compared before being retransmitted.

14. The method of claim 12 further including:
   comparing the data transmitted by one node of the self checking pair against the data transmitted by the second node of the self checking pair; and
   disabling of one node's transmission by the second node if the second node detects a miscompare between the nodes' transmitted data.

15. A method for propagating data over a meshed network of nodes comprising the steps of:
   a) establishing a node as a transmitting node for a period of time;
   b) establishing the remaining nodes as receiving nodes for a period of time;
   c) transmitting a data message from the transmitting node along all links connected to the transmitting node;
   d) each receiving node
      1) listening for an incoming message on all of its links and
      2) selecting a message as a source, if it is the only message that arrives on any of its links, or arbitrarily selecting a message as the source, if a message arrives on more than one link;
      3) locking out all links which are not designated as a source, blocking incoming data on locked out links for the remainder of the message;
      4) retransmitting each bit of data on all links, immediately after each bit of data is received by the receiving node;
      5) unlocking all links when the message is completed;
   e) providing a self checking pair of links for every link in the mesh;
   f) comparing at a node the data received from each link within a pair of links; and
   g) allowing a paired link's data to be retransmitted only if the data received from each half of a pair of links matches.

16. The method of claim 15 wherein several bits are compared before being retransmitted.

17. The methods of claim 12 or 15 wherein a pair of nodes transmits through a pair of links such that each node of the pair of nodes is capable of transmitting though only one link of a link pair.

18. The method of claim 17 further comprising the steps of:
   comparing the data received from one link of a self checking link pair by one node of the self checking node pair against the data received from the other link of a self checking link pair by this same node;
   comparing the data received from one link of a self checking link pair by the other node of the self checking node pair against the data received from the other link of a self checking link pair by this same node;
   exchanging between the nodes the results of their link comparisons; and
   allowing a paired link's data to be retransmitted only if the data received from each half of a pair of links matches in the comparisons done by both nodes.

* * * * *